(12) United States Patent
Plumpton et al.

(10) Patent No.: US 11,084,195 B2
(45) Date of Patent: Aug. 10, 2021

(54) MOLD GATE STRUCTURES

(71) Applicant: HUSKY INJECTION MOLDING SYSTEMS LTD., Bolton (CA)

(72) Inventors: James Osborne Plumpton, Enosburg Falls, VT (US); Sami Samuel Arsan, Mississauga (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 16/301,968

(22) PCT Filed: Apr. 21, 2017

(86) PCT No.: PCT/CA2017/050494
§ 371 (c)(1),
(2) Date: Nov. 15, 2018

(87) PCT Pub. No.: WO2017/201611
PCT Pub. Date: Nov. 30, 2017

(65) Prior Publication Data
US 2019/0160719 A1    May 30, 2019

Related U.S. Application Data

(60) Provisional application No. 62/342,278, filed on May 27, 2016.

(51) Int. Cl.
*B29C 45/27*    (2006.01)
*B22F 3/105*    (2006.01)
(Continued)

(52) U.S. Cl.
CPC ............ *B29C 45/2711* (2013.01); *B22F 7/08* (2013.01); *B22F 10/20* (2021.01); *B23P 15/007* (2013.01);
(Continued)

(58) Field of Classification Search
CPC .................... B29C 45/2711; B29C 2045/2714
See application file for complete search history.

(56) References Cited

U.S. PATENT DOCUMENTS

| | | | |
|---|---|---|---|
| 4,212,900 A * | 7/1980 | Serlin | B23K 35/24 |
| | | | 148/241 |
| 6,220,850 B1 | 4/2001 | Catoen et al. | |

(Continued)

FOREIGN PATENT DOCUMENTS

| | | |
|---|---|---|
| CA | 2332062 A1 | 7/2002 |
| CN | 104772854 A | 7/2015 |

(Continued)

OTHER PUBLICATIONS

PCT International Search Report; Zhang, Pengfei; Aug. 7, 2017; 3 pages.

*Primary Examiner* — Xiao S Zhao
*Assistant Examiner* — Emmanuel S Luk

(57) ABSTRACT

Disclosed herein, amongst other things, is a gate and a related method of forming the gate, having structure and steps of providing a base of a first base material, the base having a gate area, adding a layer of a second material to the base in the gate area by an additive manufacturing process to form a metallurgical bond, wherein the second material has a characteristic that differentiates the second material from the first base material and modifying an inner surface in the gate area comprised of the second material to define the gate.

39 Claims, 10 Drawing Sheets

(51) Int. Cl.
  *B22F 7/08* (2006.01)
  *B23P 15/00* (2006.01)
  *B33Y 80/00* (2015.01)
  *B22F 10/20* (2021.01)
  *C22C 26/00* (2006.01)
  *C22C 29/08* (2006.01)

(52) U.S. Cl.
  CPC .......... *B29C 45/2708* (2013.01); *B33Y 80/00* (2014.12); *C22C 26/00* (2013.01); *C22C 29/08* (2013.01); *Y02P 10/25* (2015.11)

(56) References Cited

U.S. PATENT DOCUMENTS

| | | | | |
|---|---|---|---|---|
| 6,305,923 B1* | 10/2001 | Godwin | | B29C 45/1603 425/143 |
| 6,817,550 B2* | 11/2004 | Taylor | | B05B 1/00 239/591 |
| 7,134,868 B2* | 11/2006 | Babin | | B29C 45/278 425/549 |
| 7,628,234 B2* | 12/2009 | Middlemiss | | C22C 26/00 175/420.1 |
| 8,512,023 B2* | 8/2013 | Judd | | B29C 45/2602 425/121 |
| 9,272,453 B1* | 3/2016 | Keir | | B29C 45/2711 |
| 9,296,139 B2 | 3/2016 | Dezon-Gaillard et al. | | |
| 10,173,258 B2* | 1/2019 | Kawano | | C22C 38/44 |
| 10,363,605 B2* | 7/2019 | Xue | | B29C 49/48 |
| 2002/0065573 A1 | 5/2002 | Mazmunder et al. | | |
| 2002/0110649 A1 | 8/2002 | Skszek et al. | | |
| 2003/0124216 A1* | 7/2003 | Guenther | | B29C 45/2737 425/549 |
| 2003/0189114 A1* | 10/2003 | Taylor | | C04B 35/52 239/602 |
| 2004/0211222 A1* | 10/2004 | Hosoe | | C23C 14/165 65/374.12 |
| 2006/0165973 A1* | 7/2006 | Dumm | | C23C 28/00 428/323 |
| 2008/0090099 A1* | 4/2008 | Ramm | | C23C 14/027 428/699 |
| 2008/0145472 A1* | 6/2008 | Oikawa | | B29C 33/38 425/556 |
| 2008/0154380 A1* | 6/2008 | Dixon | | A61F 2/4425 623/17.16 |
| 2008/0292745 A1 | 11/2008 | Shmitz | | |
| 2010/0092601 A1* | 4/2010 | Klobucar | | B29C 45/278 425/548 |
| 2011/0183030 A1* | 7/2011 | Belzile | | B29C 45/27 425/547 |
| 2012/0213884 A1* | 8/2012 | Judd | | B29C 33/565 425/567 |
| 2014/0183788 A1* | 7/2014 | Judd | | B29C 45/20 264/328.1 |
| 2014/0352943 A1* | 12/2014 | Domec | | C23C 28/36 166/77.51 |
| 2015/0089992 A1* | 4/2015 | Amtmann | | B23K 26/342 72/470 |
| 2015/0202811 A1* | 7/2015 | Tabassi | | B29C 45/2735 425/588 |
| 2015/0231818 A1* | 8/2015 | Hackett, Jr. | | C08J 5/00 428/36.92 |
| 2016/0160661 A1* | 6/2016 | Balbach | | F01D 11/122 416/241 R |
| 2017/0120516 A1* | 5/2017 | Larsen | | B33Y 10/00 |
| 2017/0182555 A1* | 6/2017 | Buschkamp | | B22F 3/1055 |
| 2017/0259481 A1* | 9/2017 | Slisse | | B29C 45/2737 |
| 2018/0087134 A1* | 3/2018 | Chang | | C22C 26/00 |

FOREIGN PATENT DOCUMENTS

EP 2080604 A1 7/2009
WO 2015127271 A1 8/2015

* cited by examiner

MOLD GATE STRUCTURES

TECHNICAL FIELD

The present invention generally relates to mold gate structures including mold gates, mold gate inserts, mold cavity inserts, mold assemblies, injection nozzles, injection nozzle assemblies, nozzles and nozzle tips, and injection molding machines including the foregoing. Furthermore, the present invention relates to methods of forming and making such mold gate structures, inserts, injection nozzles and nozzle tips, assemblies and machines.

BACKGROUND

Injection molding machines are well known and commonly used to produce a wide variety of molded articles (such as, for example, plastic articles including plastic bottles). The articles may be formed from a wide range of materials. One common category of articles is preforms for plastic bottles made from plastics including polyethylene terephthalate ("PET"). Generally, a mold material, such as, for example, a plastic resin in the form of pellets, may be fed to an injection molding machine through a hopper, and then to a plasticizer where it is melted. The resin may then flow under pressure to a nozzle, and be injected through a mold gate into a mold cavity. In the cavity, the material can be cooled, and it can be ejected from the mold cavity to complete a single molding cycle.

One area where there have been problems with injection molding equipment is that of the mold gate where the resin passes into the mold cavity. In a typical hot runner injection molding system, mold gate problems can occur. Such problems may result from a variety of causes including corrosion, erosion and wear.

A mold gate is a passage, generally in the form of a tapered hole or opening that may be formed in a gate area or in a gate insert. The mold gate directs the flow of resin from the nozzle to the mold cavity. The mold gate may be formed in various areas of the injection molding apparatus, including but not limited to on the mold cavity side, such as a mold insert of the mold stack and/or in the area of the nozzle including the nozzle tip. There are different types of mold gates including mechanically controlled mold gates and thermally controlled mold gates. The mold gate structure defining the mold gate may also act as a locator for a nozzle tip on one side, and may form part of the mold cavity on its other opposite side. A mold gate's nozzle side can be subject to a constant high nozzle tip temperature. The opposite side of the mold gate must quickly cycle between a high temperature when the gate is open to a low temperature sufficient to freeze the resin when the mold has been filled and the gate has been closed. These temperature variations and cycles can result in significant erosion and/or corrosion in the vicinity of the mold gate.

Additionally, many mold gates are in the form of a valve mold gate and include a valve stem that moves into and out of contact with the valve mold gate structure to open and close the mold gate. This repeated engagement of the valve stem with the valve mold gate structure typically causes significant wear over time that can result in a detrimental impact on the operation of the valve mold gate.

The component or components that form the mold gate structure typically have to be machined to a significant extent and so may be desirably made from materials that readily facilitate machining. Additionally, it may be desirable that such components be made from materials that are relatively inexpensive. However, such materials may not be highly resistant to wear, erosion and/or corrosion in the mold gate area. While some techniques have been employed to attempt to alleviate the problem of deterioration resulting from wear, erosion and corrosion in the mold gate over time, improvements are desired.

SUMMARY

In accordance with an aspect disclosed herein, there is provided a method of forming a gate, the method comprising providing a base of a first base material, the base having a gate area, adding a layer of a second material to the base in the gate area by an additive manufacturing process to form a metallurgical bond, wherein the second material has a characteristic that differentiates the second material from the first base material and modifying an inner surface in the gate area comprised of the second material to define the gate.

In accordance with another aspect disclosed herein, there is provided a method of forming a gate in a mold component, the method comprising providing a base made from a first material, forming a gate area in the base, providing a second material that has a characteristic that differentiates the second material from the first material, adding a layer of the second material to the base in the gate area by an additive manufacturing process to form a metallurgical bond with an adjacent material, and forming the gate such that an inner surface of the second material defines the gate.

In accordance with yet another aspect disclosed herein, there is provided a gate comprising a base made from a first material, the base having a gate area, a layer formed above the first material in the gate area, the layer being made of a second material that has a characteristic that differentiates the second material from the first material, wherein the second material is metallurgically bonded to the first material and has an inner surface that defines the gate.

In accordance with a further aspect disclosed herein, there is provided a gate comprising a base made from a first wear resistant material, the base having a gate area, a layer formed above the first wear resistant material in the gate area, the layer being made of a second wear resistant material that has a characteristic that differentiates the second wear resistant material from the first wear resistant material, wherein the second wear resistant material is formed above a surface of the first wear resistant material by an additive manufacturing process.

In accordance with yet a further aspect disclosed herein, there is provided a gate comprising a base formed of a first material having a first hardness, the base having a gate area and an inner layer formed on the base in the gate area, the inner layer made of a second material having a second hardness that is relatively higher than the first hardness, wherein the second material is metallurgically bonded to the first material and an inner surface of the inner layer defines the gate.

These and other aspects and features of non-limiting embodiments will now become apparent to those skilled in the art upon review of the following description of specific non-limiting embodiments in conjunction with the accompanying drawings.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
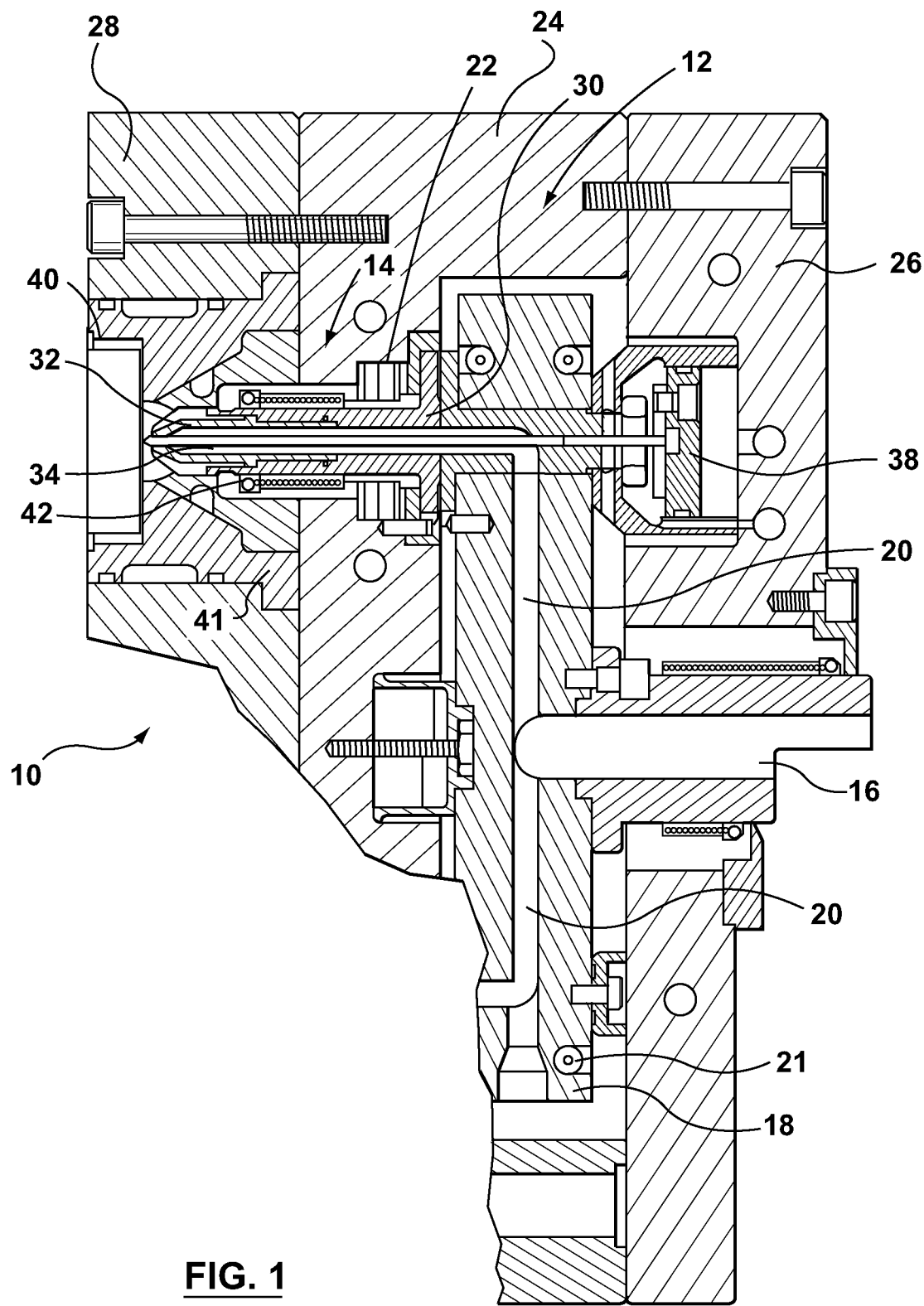
FIG. 1 is a cross sectional view of a portion of a hot runner system of an injection molding machine.

FIG. 1 shows a cross section of a portion of one example of an injection molding machine 10, including a hot runner system 12. Hot runner system 12 may provide a molding material such as for example a molten plastic resin to a plurality of gate nozzle assemblies 14. Injection molding machine 10 may be used to produce a variety of articles such as for example PET preforms. As is well understood by those of skill in the art, PET is particularly sensitive to uneven cooling effects that can result in crystallinity and other physical defects. However, other injection molding machines may be employed and other articles produced, including but not limited to, plastic injection molding systems, plastic compression molding systems, metal molding systems and articles produced therefrom.

Molten plastic resin may be supplied to hot runner system 12 from a resin source (not shown), typically a hopper feeding resin pellets to a plasticizer and from there to a main melt channel 16. Main melt channel 16 can convey the formed resin to a manifold 18. Manifold 18 may have a number of manifold melt channels 20 through which the resin can travel to nozzle assemblies 14 while it can be maintained at an optimum processing temperature by manifold heaters 21.

Nozzle assembly 14 may be positioned within a bore 22 provided in a manifold plate 24, sandwiched between a manifold backing plate 26 and a cavity plate 28. A cavity member 41 may be located in cavity plate 28.

Nozzle assembly 14 may include a nozzle housing 30 in which is held a nozzle tip 32 through which runs a nozzle channel 34 communicating with manifold melt channel 20. A valve stem 36 (see FIG. 2) can be located within nozzle channel 34 and can be reciprocated by a piston 38 between an open position and a closed position. In the open position, the resin may flow into a mold cavity 40 formed in cavity member 41 located in cavity plate 28. In the closed position, as shown, the valve stem 36 may be forced against a gate 44 (see FIG. 2) to restrict the flow of resin from the nozzle tip 32 and prevent the flow of resin into the mold cavity 40. A nozzle heater band 42 can be provided to maintain nozzle tip 32 at a desired temperature determined by the resin being injected. For example, in an injection molding machine for molding PET preforms, the temperature of the nozzle tip 32 can be maintained in the range of for example about 280 degrees Celsius to about 320 degrees Celsius.

Referring again to FIG. 2, a cross section of a portion of injection molding machine 10 surrounding the nozzle assembly 14 is shown. Nozzle assembly 14 is shown in a closed position with valve stem 36 seated in gate 44, thereby sealing the gate 44 and preventing the flow of resin into mold cavity 40. Gate 44 is a passage that provides an entry point for the resin into mold cavity 40. Gate 44 may in some non-limiting embodiments be a thermally controlled gate and in other non-limiting embodiments a mechanically controlled gate. Where it is desired to employ mechanical valve gating to control the flow of resin into the mold cavity 40, gate 44 may be formed in a gate area such as in a gate area 50 of a gate insert 48. Wear of the gate area 50 can occur by repeated opening and closing of the gate 44. This wear may occur particularly in gate area 50 formed in gate insert 48 where the tip of valve stem 36 seats in the closed position. Gate area 50 may be a generally tapered section of gate 44 that is complementary to the tapered tip of the valve stem 36 (not shown).

The inner surfaces of gate insert 48, including the inner surfaces in gate area 50, which are in contact with the molten resin, can also be subject to the corrosive influences of certain molten resins. This corrosive impact can particularly occur in the region 52 (see FIG. 2) surrounding the nozzle tip 32, where molten resin collects during operation of injection molding machine 10. This corrosive impact can also occur in the gate area 50 of gate insert 48 that defines gate 44.

A cooling device, such as cavity cooling channels 54, may be provided in a cavity member 41 to cool the resin injected into mold cavity 40 and to form an article 56, such as a preform. A cooling fluid, such as water, can be circulated through the cavity cooling channels 54 during a cooling phase of an injection cycle. The gate insert 48 may also be provided with a cooling device, such as gate cooling channels 58, through which a cooling fluid can also circulate. Further cooling of the article 56, is generally provided within a core 59 forming the interior surface of mold cavity 40.

Figure 2:
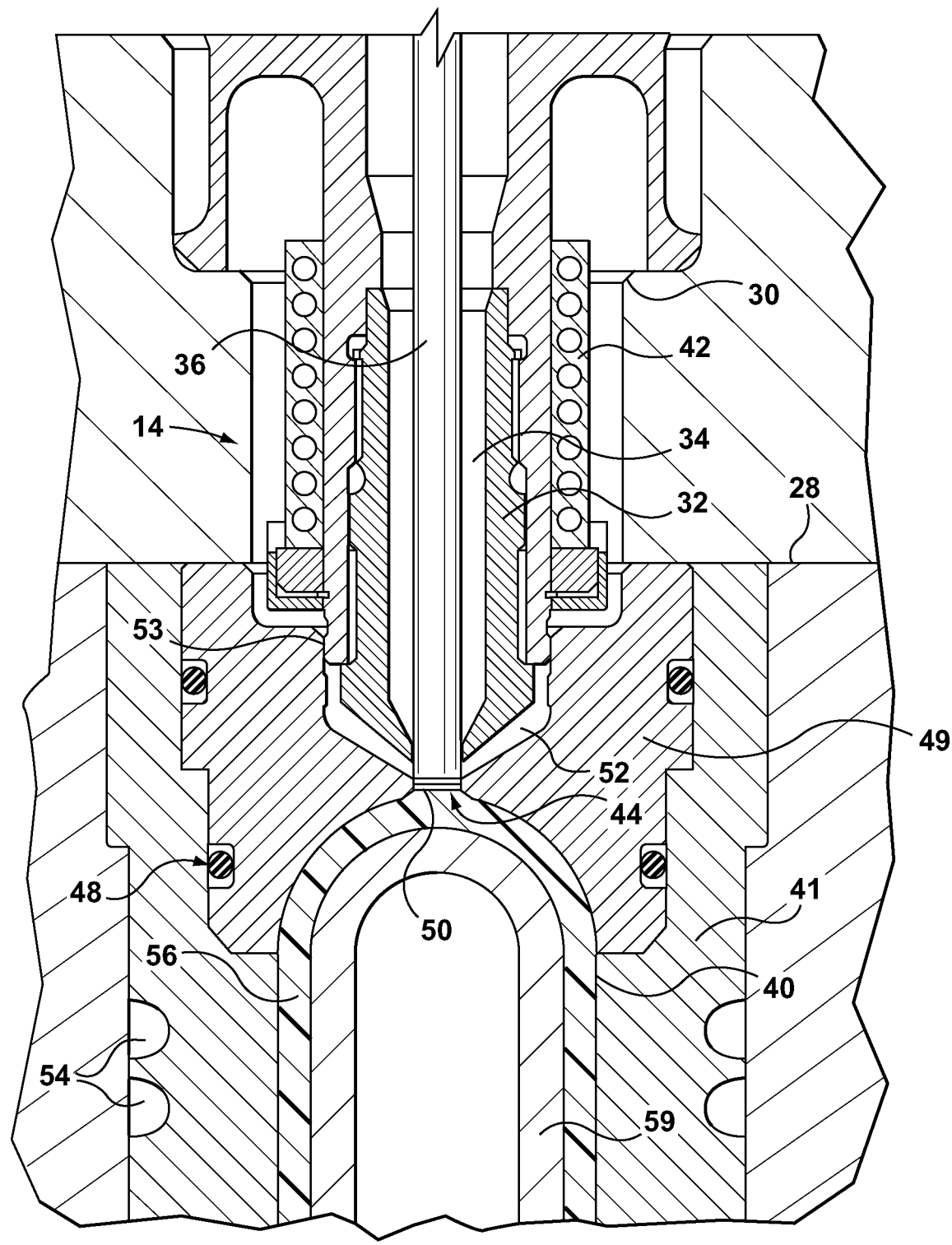
FIG. 2 is a cross sectional view of a mold gate area of an injection molding machine, including a mold gate insert.
Figure 2A:
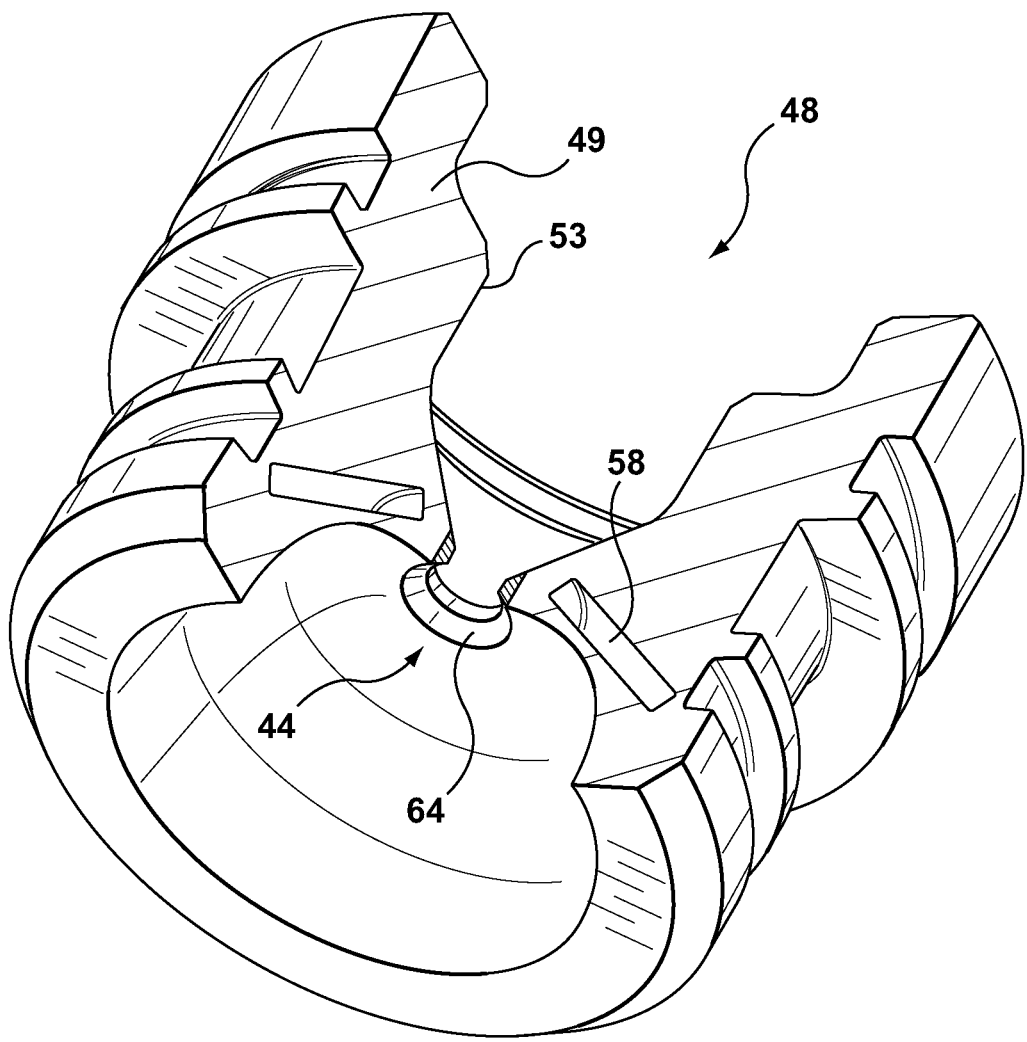
FIG. 2A is a perspective view, partially cut away, of a mold gate insert as shown in FIG. 2.

The construction of a mold gate structure, such as for example gate insert 48, will be described with reference to FIGS. 2, 2A and 2B(I). Gate insert 48 may comprise a base 49 formed of a first base material 100 (see FIG. 2B(I)) that may be relatively hard and strong material but may also be highly thermally conductive and may also be particularly suitable for machining. Examples of such base materials 100 include suitable tool steels such as for example H13 tool steel and 420 stainless steels. The first base material 100 may comprise more than one substance, compound or element. The first base material 100 may be chosen with qualities such as one or more of: (a) relatively low cost (relative to exotic wear resistant materials); (b) relatively high degree of manufacturability; (c) polishability (for a mold cavity surface if applicable); (d) thermal conductivity and (e) in some cases corrosion resistance. Appropriate base materials 100 are typically tool steels, however in some cases high conductivity materials (such as for example Beryllium—Copper [BeCu]) may be used with a hard faced coating or layer that is harder than the lower base material. There are a variety of coating methods including but not limited to: chemical or physical vapor deposition, chemical or electro chemical deposition, spraying, dip coating, spin coating, etc. In this method, the coating takes the outside form of the workpiece and generally is built up with a uniform thickness across all surfaces of the part. Some part surfaces may be masked, so as to eliminate the application of the coating to those surfaces. Such coatings can be used to increase the wear resistance or corrosion resistance of the base material, as well as improve its release properties (i.e. non-stick). The layer may also be applied by an additive manufacturing process that can build up geometry in any desired shape either on top of a workpiece or without any workpiece. An additive manufacturing process is a method in which material is added, usually layer by layer, to either a workpiece or from nothing, and this layer by layer additive process eventually generates the shape of the part. Relevant examples of additive manufacturing techniques capable of doing what is described herein can generally be broken in to two groups: 1. Additive process that uses a high power energy source (laser, electron beam) to melt a layer of powder that has been deposited on a substrate; 2. Additive process that uses the kinetic energy of powder particles to plastically deform the powder on to the workpiece (cold spray).

Base 49 can define part of the mold cavity 40 and a cavity for receiving the nozzle assembly 14. The base 49 of the gate insert 48 can further includes a nozzle assembly alignment portion 53 for contacting and aligning the nozzle assembly 14. The base 49 may be shaped to provide for the gate 44 for communication between the nozzle assembly 14 and the mold cavity 40.

Also with reference to FIG. 2B (I), the inward facing surface 51 of base 49 in the gate area 50 of the gate 44 made of the first base material 100, may have a second material layer 120 applied above surface 51, and in this embodiment directly thereto, by an additive manufacturing process to form a metallurgical bond as described hereinafter.

The second material layer 120 may be made from a second material having at least one characteristic that differentiates the second material from the first base material 100. Such characteristics may include one or more of (a) improved wear resistance (i.e. resistance to loss of material/damage from a mechanical source such as for example from movement of the valve stem in the gate), (b) improved erosion resistance (resistance to loss of material arising from the flow of plastic (and its filler materials if applicable) though the gate), (c) improved corrosion resistance (resistance to loss of material/other damage due to chemical interactions occurring with the material in the vicinity of the gate; and (d) increased hardness.

The second material layer 120 may be harder and thus more wear resistant than the first material. Hardness may be measured by techniques known in the art, such as using a Mohs scale (for scratch hardness), Vickers, Rochwell, Shore or Brinell scale (for indentation hardness), or Leeb or Bennett scale (for rebound hardness). It is usually the case that the harder the material, the greater the wear resistance. Suitable wear resistant second material layer 120 materials may be metals, diamond particles, carbide particles, ceramics and the like and any combination thereof. More specifically, suitable wear resistant materials may include, but is not limited to, diamond metal matrix composites, tungsten carbide, tungsten carbide cobalt, cobalt alloys, nickel based carbide alloys, nickel chrome molybdenum alloys.

To facilitate the metallurgical bonding of the second material layer 120 material to the first base material 100, the second material layer 120 does not necessarily have to have a lower melting temperature than the first base material 100. For example, the second material layer 120 material may be heated locally such as with a laser and then added to the first base material 100 without melting the first base material 100.

In a preferred non-limiting embodiment, first base material 100 may be H13 tool steel, and second material layer 120 may be Tungsten Carbide, with second material layer 120 being in the range of 0.5 to 3 mm in depth.

By providing a second material layer 120 for the inward facing surface of gate insert 48, particularly in the gate area 50 surrounding and defining the gate 44, the overall wear, erosion and/or corrosion resistance of the gate area 50 defining the gate 44 can be improved and the life span of gate insert 48 may be extended.

Thus, gate 44 may be provided that includes: (a) base 49 made from a first base material 100, with the base 49 having a gate area 50, and (b) a second material layer 120 formed above and directly on the first base material 100 in gate area 50, the second material layer 120 being made of a material that has a characteristic that differentiates the second material layer 120 from the first base material 100. The second material layer 120 may be metallurgically bonded to the first base material 100 and may have an inner surface that defines the gate 44. The differentiating characteristic may be increased resistance to at least one of mechanical wear, erosion and corrosion.

The operation of injection molding machine 10 will now be described over the course of an injection cycle, with reference to FIGS. 1-2A. In a typical injection cycle, valve stem 36 is retracted by piston 38 out of seating contact with the gate 44 provided by gate insert 48 to open the gate 44. Resin, fed by the hot runner system 12 to nozzle channel 34, and hence to nozzle tip 32, can be conveyed under pressure to mold cavity 40 through gate 44. Throughout the cycle, nozzle tip 32 may be continuously or intermittently heated by nozzle heater bands 42. As the resin is being conveyed into the mold cavity 40, the cavity cooling channels 54 and the gate cooling channels 58 are inactive thereby permitting the resin to fill the mold cavity 40 before beginning to freeze/harden. Once the mold cavity 40 is filled, valve stem 36 can be advanced to come to rest in gate 44 to stop the flow of resin. Simultaneously, the cavity cooling channels 54 and the gate cooling channels 58 may be activated and the resin cools to form article 56. The mold opens, and finished molded articles can then be ejected from the mold, and from the injection molding machine 10. The mold then closes, and the cycle repeats.

Methods of manufacturing the gate 44 are provided. Unlike a conventional process which may manufacture a mold gate structure by only cutting away materials to form the mold gate (i.e. subtractive manufacturing process) or by pressing or swaging together two portions to form a gate insert structure (a mere mechanical process with no bonding whatsoever between the two portions), the present process uses an additive manufacturing process, in that the inner layer is metallurgically bonded to the base material. Such an additive manufacturing process may comprise melting the second wear/erosion/corrosion resistant material and then when and as it cools down, fusing the second material and the first material together at the interfacing surfaces, thereby forming a metallurgical bond between the two materials.

Instead of only cutting/machining away unwanted materials starting from a block of material, the present process may include building up a base of one material by adding at least a second layer of another material on top of the base, with the second layer being metallurgically bonded to the first layer with an additive manufacturing process.

An example of such an additive manufacturing process is where the second wear resistant material in the form of a powder or a wire is deposited onto the first outer layer of material. This may be carried out using laser deposition processes. Examples of second wear resistant material that may be employed in a powdered form are wear resistant metals, ceramics or metal matrix composites.

The powder or the wire forming the second material may be melted with a high powered heat source such as for example a laser or electron beam.

The melted second material may then form close contact with the first material, then cool and fuse together with the surface of the first base material at the interface surfaces. The result is that the second material becomes metallurgically bonded to the first material layer.

In the present context, the term "metallurgical bond" or "metallurgically bonded" refers to the fusing together of the interfacing surfaces of the first base material and the second wear/erosion/corrosion resistant material such that the materials at the interfacing surfaces blend together to form a continuous zone interconnecting the two layers. No new chemical bonds are formed between the two materials. However, the fusing together may decrease discontinuities at the interface as some of the material from the melted second material may fill in the surface pores of the base material. Once the second material cools and hardens, a relatively strong mechanical bond can be formed with the base material.

The mechanical strength of the bond between the first and second materials with such metallurgically bonded components may be higher than the mechanical strength of two components being pressed or swaged together (as for example is depicted in the teachings of U.S. Pat. No. 6,220,850).

Additionally, since the inner surface of the layer of second material will then cover the top surface of the base material, the second material will be the material that is in contact with, for example, a valve stem and/or the resin, and will be able to better resist erosion, corrosion or mechanical wear than the first material of base 49.

In some embodiments both a small portion of the first material of the base 49 and the second material may be heated above their melting temperatures and the melted materials caused to mix together to form a metallurgical bond. However, the melting of the first material of the base 49 would have to be done very locally (e.g. possibly with a laser or electron beam) so that most of the base's first material is not negatively impacted (i.e. properties such as strength, hardness, microstructure, etc. are not compromised). Additionally, while it may not be necessary that the second material completely cover the first material of the base 49 in the gate area 50, typically it would be desirable for it to do so.

Thus, and as noted above, the second material 120 may be added to the first based material 100 by an additive manufacturing process such as one of the additive manufacturing processes referenced as above.

With reference now to the sequential figures of FIGS. 3 to 8B, a non-limiting example method of forming a gate structure in a component 111 (shown in FIG. 8A) of a mold for an injection molding machine 10 is schematically illustrated.

Figure 3:
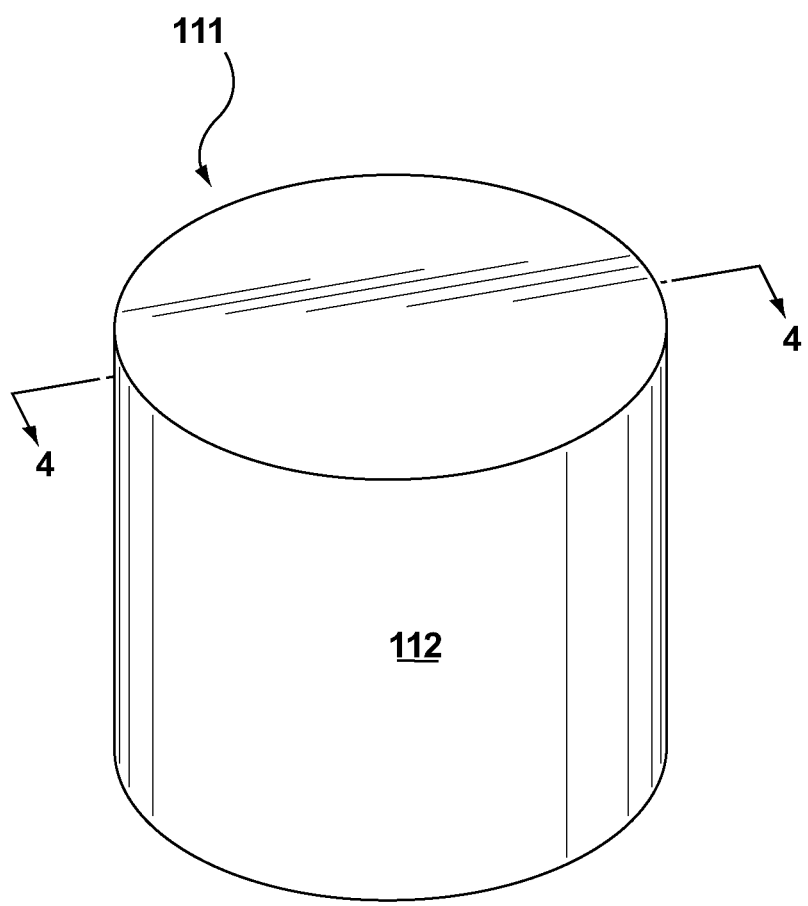
FIG. 3 is a perspective view of a blank for use in forming a mold cavity insert.

As shown in the non-limiting embodiment depicted in FIG. 3, a mold component 111 can be made from a solid blank 112 (e.g. a cylindrical block) of a first material (also called a base material). The entirety of the mold component 111 may be provided as a separate integral piece of material as illustrated. However, the following process for forming mold component 111, may be readily adapted to form a gate insert 48 with a gate 44 of the type described above in relation to injection molding machine 10. Mold component 111 could be any such mold component containing a gate structure.

With respect to mold component 111, the first material may be a first base material 100 as indicated above in relation to gate insert 48, such as, for example, H13 tool steel.

Figure 4:
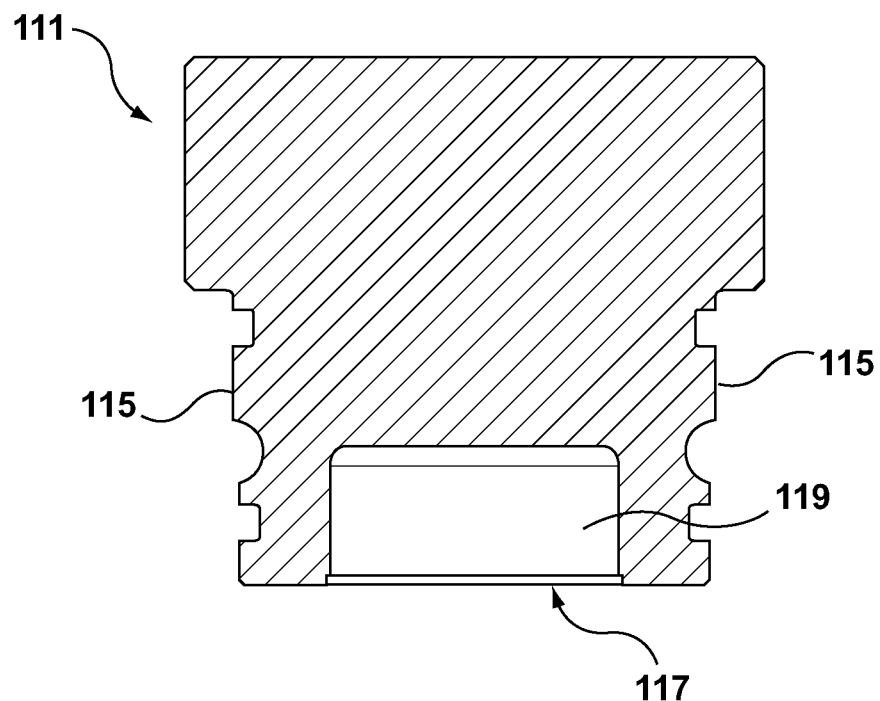
FIG. 4 is a vertical cross section view of the blank of FIG. 3 at line 4-4, the blank having undergone a first stage of processing.

As shown in the non-limiting embodiment depicted in FIG. 4, first the outer profile 115 of the mold component 111 may be roughly formed. This step could also be done later but prior to the mold component 111 being heat treated as referenced below. Mold component 111 may typically be roughly formed, however it would not be finish formed (formed to its final dimensions) until after heat treatment in a known manner. Also the profile 119 of the inner cavity 117 may also be roughly formed and may be formed by conventional apparatuses and methods such as by turning the mold component 111 in a lathe, and again may not be finish formed until after heat treatment.

Figure 5:
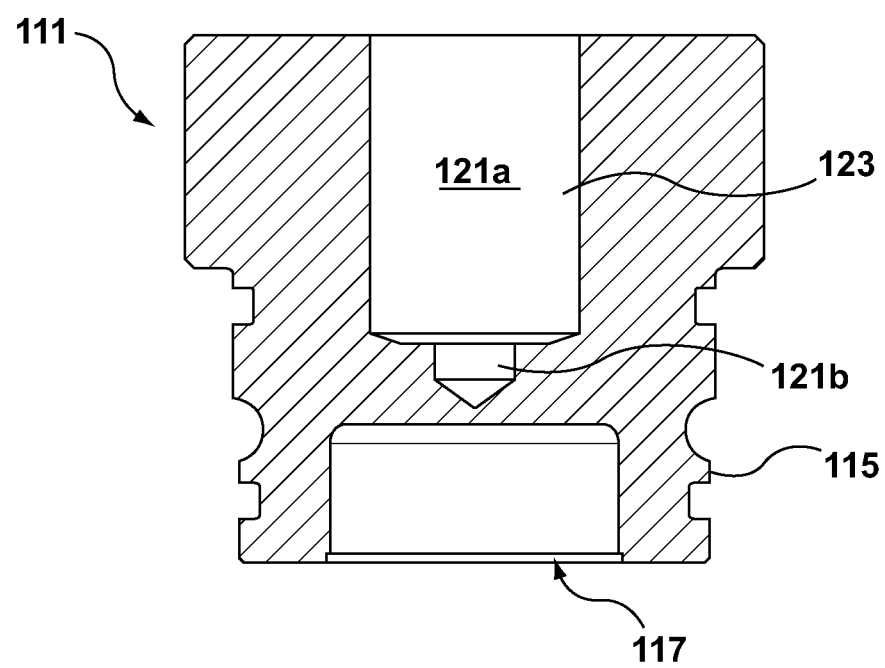
FIG. 5 is a vertical cross section view of the blank of FIG. 3 having undergone a second stage of processing.

Next, as shown in the non-limiting embodiment depicted in FIG. 5, the nozzle bore 123 can be roughly formed and can include an upper portion 121a and a lower portion 121b narrower than the upper portion 121a. The lower portion 121b can generally provide a gate area 125 (see FIG. 6B). The nozzle bore 123 including lower portion 121b may be formed using conventional apparatuses and methods such as with a lathe or milling machine.

Figure 6A:
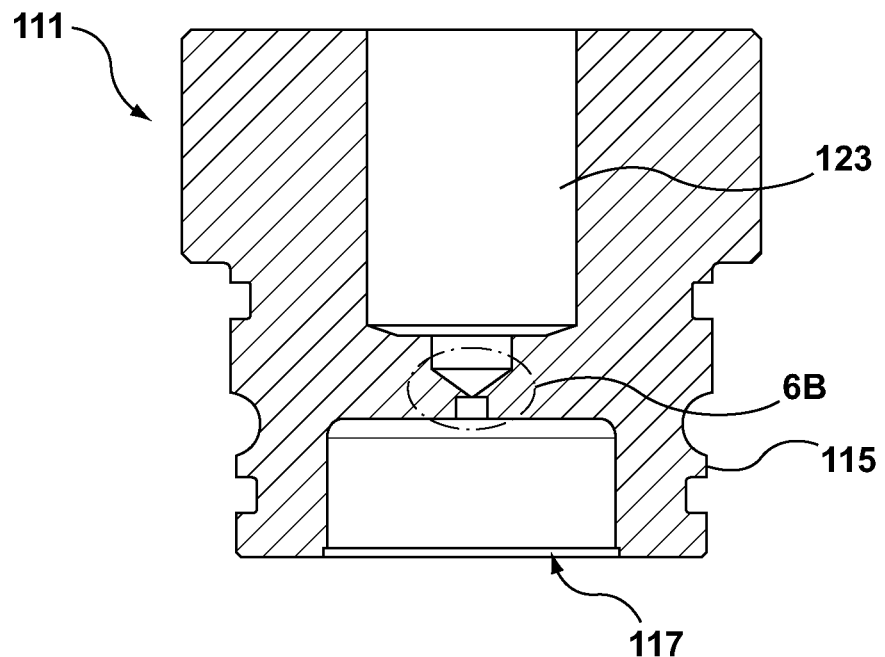
FIG. 6A is a vertical cross section view of the blank of FIG. 3 having undergone a third stage of processing.
Figure 6B:
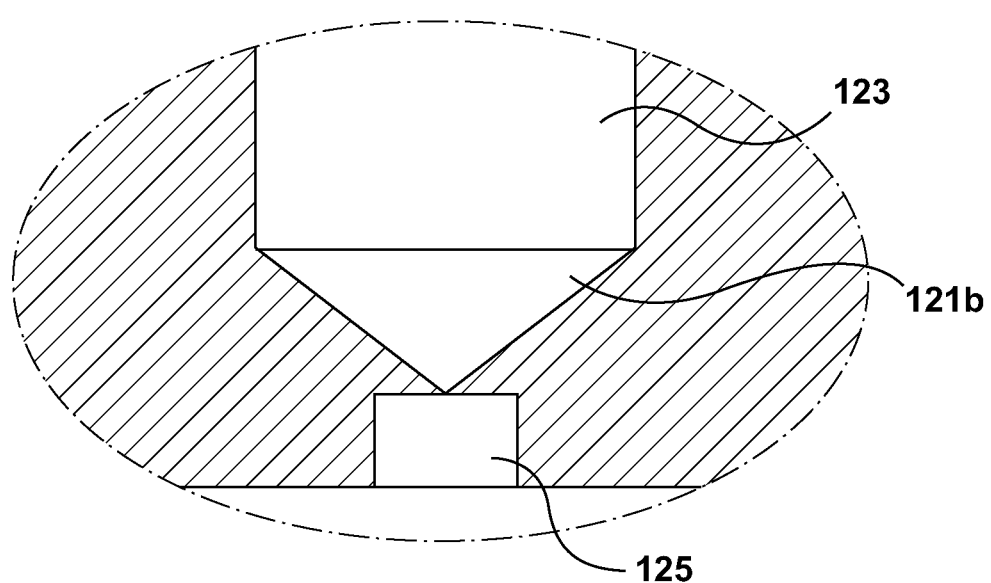
FIG. 6B is an enlarged view of part of FIG. 6A, designated as 6B.

Thereafter, as shown in the non-limiting embodiment depicted in FIGS. 6A and 6B, from the mold cavity side of the mold component 111, portions of first base material 100 can be removed from gate area 125 beneath lower portion 121b of nozzle bore 123 by conventional apparatuses and methods such as drilling, turning on a lathe or milling. The amount of first base material 100 removed from gate area 125 will be more than is required to define gate 44 (see FIG. 8B) in order to allow additional material forming the second material layer 120 to be added to gate area 125 to provide a desired size and configuration for gate 44.

Thereafter, the entirety of the mold component 111 may be heat treated in a known manner to harden the first material to a sufficiently hard state.

Figure 7A:
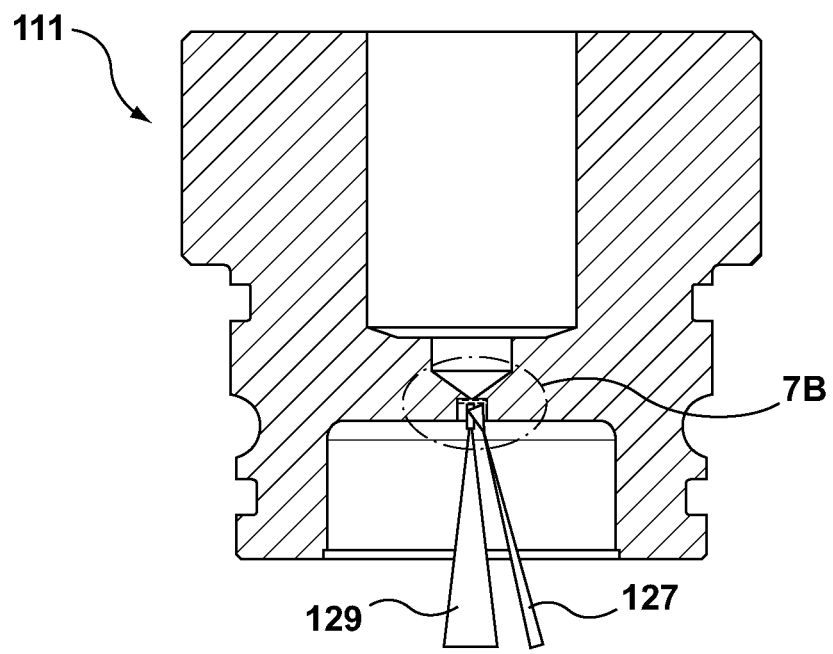
FIG. 7A is a vertical cross section view of the blank of FIG. 3 having undergone a fourth stage of processing.
Figure 7B:
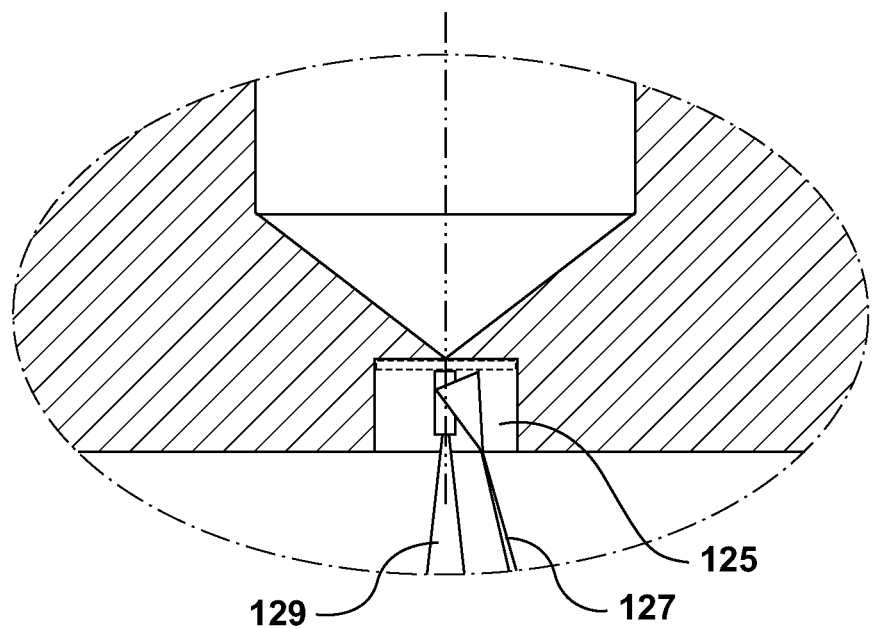
FIG. 7B is an enlarged view of part of FIG. 7A, designated as 7B.

Once the heat treatment has been concluded, next, as depicted in the non-limiting embodiment depicted in FIGS. 7A and 7B, an additive manufacturing process can be conducted in gate area 125 to add a second material layer 120 onto the inner surface of gate area 125. In some embodiments, all of the gate area 125 may be filled with the material of the second material layer 120 as part of the additive manufacturing process. By way of example, a suitable additive material 127 in the form of a powder or wire may be deposited onto the mold component 111 in and in the vicinity of gate area 125. The additive material may be a material of second material layer 120 as described above. The additive material may then be melted using a high power/energy source 129, such as for example a laser beam or electron beam. Once the additive material has been melted, and fills the gate area 125, it can cool and solidify against the base material, such as H13 tool steel, and a metallurgical bond is created between the base material and the additive material, such as is described above.

Figure 8A:
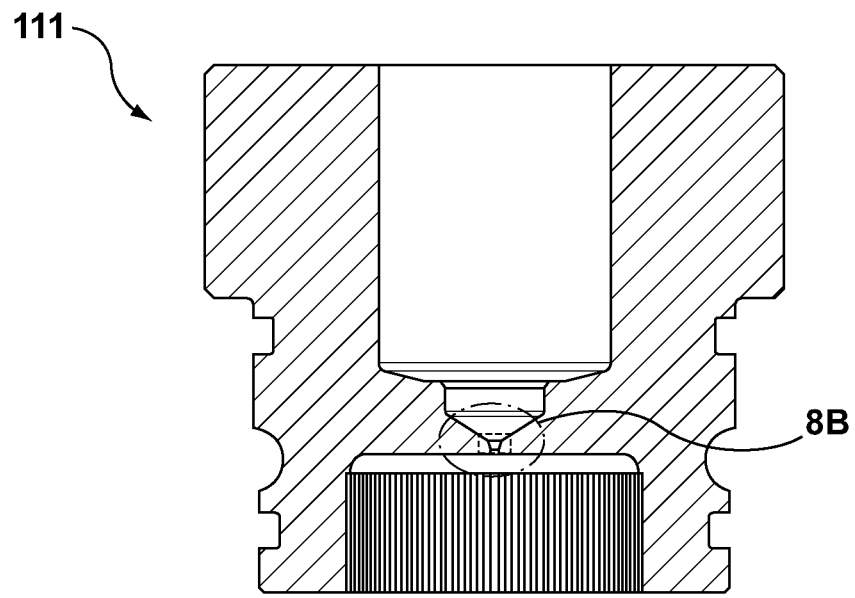
FIG. 8A is a vertical cross section view of the blank of FIG. 3 having undergone a fifth stage of processing.
Figure 8B:
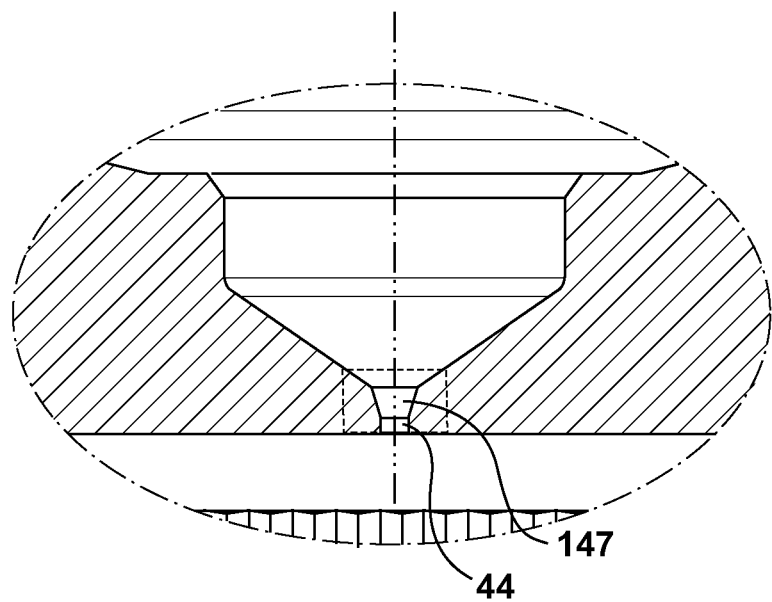
FIG. 8B is an enlarged view of part of FIG. 8A, designated as 8B.

Thereafter, with reference to the non-limiting embodiment depicted in FIGS. 8A and 8B, the specific final form of the inner surface of the inner cavity 117 can be formed by suitable apparatuses and methods such as by electro-discharge machining ("EDM") and may be polished by known apparatuses and methods to produce a suitable finish for the inward facing surface of the mold cavity.

Also, as illustrated in FIGS. 8A and 8B, the gate 44 and nozzle bore well 147 in lower portion 121 can be machined to precise tolerances using conventional apparatuses and methods such as EDM or jig grinding. It will be appreciated that modifying of the inner surface of the second additive material in gate area 125, such as for example by machining, the configuration of the gate 44 can be formed. Machining or otherwise modifying the second additive material may be more difficult compared with machining of the first base material because of the increased hardness/wear resistance or other characteristic of the second material compared to the first material. However, that more difficult processing would only be required in a limited part of the gate area 125 where the second material layer 120 has been added, and which is machined to create the desired mold gate profile.

The result may be that the mold component 111 is a single integrally formed component that provides for a substantially seamless mold cavity surface defined by the inner surface of a base material, and that extends throughout the mold cavity, through the mold gate area 125 and into the nozzle area. The only change of material from the mold cavity to the nozzle area may be in the mold gate area 125. In that mold gate area 125, the gate 44 may be defined by the inner surface of a layer of material metallurgically bonded on the base material, with the layer made from a different material than the rest of the component but also with the interface at the end of the second material being smoothed out by the machining process. The second material layer 120 may cover the majority of the first base material 100 in the gate area 125 and typically may completely cover the first base material 100 in the gate area 125.

Figure 2B:
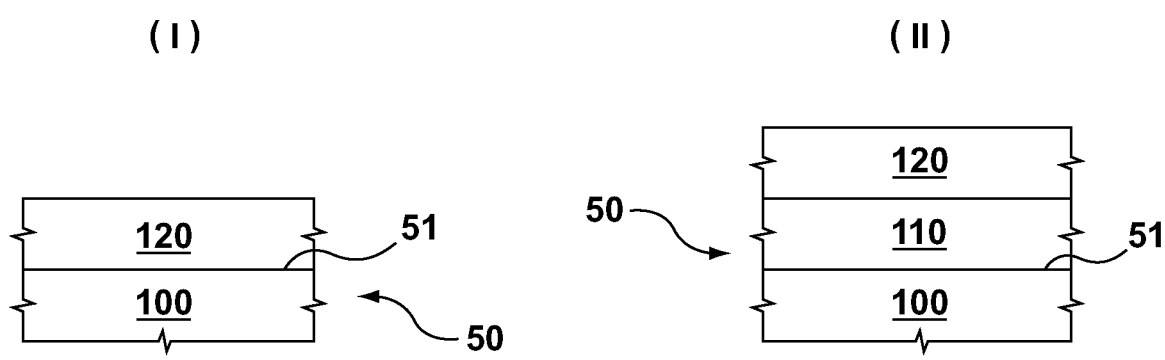
FIG. 2B (I) and (II) are schematic cross section views showing layers of material in two different example embodiments of gate areas.

With reference to FIG. 2B(II), in an alternate embodiment, a third interstitial layer 110 (buffer) may be provided that may be a material that forms a separate intermediate layer between the first base material 100 and the second material layer 120. The interstitial layer 110 may be deposited over the first base material 100 with an additive manufacturing process as referenced above, forming a first metallurgical bond, and then the second material layer 120 (such as is referenced above) may be deposited over the interstitial material layer 110 also with an additive manufacturing process forming a second metallurgical bond, preferably just with the interstitial material layer 110 and not the first base material 100. Interstitial materials, when required, are selected based on the incompatibility of the base material and additively formed material.

In a preferred embodiment, first base material may be H13 tool steel, interstitial layer 110 may be Nickel Chromium metal matrix and the second material layer 120 may be Diamond powder. Interstitial layer 110 may in the range of 0.05 to 0.5 mm in depth and second material layer 120 may be in the range of 0.5 to 3 mm in depth.

The interstitial layer 110 may be provided as a buffer or transition layer between potential incompatibility between the first base material 100 and the second material layer 120. As such, the wear/erosion resistance characteristics of interstitial layer 110 may not be of significant importance. Additionally, the melting temperature of the interstitial layer 110 may also not be critical as it will likely be deposited in very thin layers (so as not to excessively heat up the first base material 100). In one possible embodiment the interstitial layer 110 has a coefficient of thermal expansion (CTE) that is in between the CTEs of the first base material 100 and the material of the second material layer 120, such that there is a more gradual transition of CTEs from the first base material 100 to the second material layer 120. This can enhance thermal shock capacity, chipping, spalling etc.

The interstitial layer 110 may be applied in any additive manufacturing process including for example using laser deposition processes as referenced above. The interstitial material 110 could be added in the same manner as the second material layer 120, such that for example, if the second material layer 120 was added via a powder stream with laser heating, then prior to building up the second material layer 120, the interstitial material could be first blown in via the powder stream and then melted locally to form a metallurgical bond with the first base material 100. After the interstitial material 110 had been deposited, the powder stream could then be switched to deposit the second material layer 120. This same process may be applied regardless of whether the material is added via powder stream or by feeding a wire or tape of material. The interstitial layer 110 may be deposited in the case that the second material layer 120 was not compatible (e.g. has a different CTE, or a tendency not to bond well) with the first base material 100.

Typically the interstitial layer 110 would be allowed to fully solidify on to the first base material 100 before the second material layer 120 is applied to the outer surface of the interstitial layer 110. The interstitial material layer 110 may typically be applied after the nozzle bore 123 is formed, as referenced above and depicted in FIGS. 6A and 6B. The second material layer 120 may then be applied thereafter.

The interstitial layer 110 may cover the majority of the first base material 100 in the gate area 125 and typically may completely cover the base first base material 100 in the gate area 125. Similarly, the second material layer 120 may cover the majority of the interstitial layer 110 and typically may completely cover the interstitial layer 110. In some embodiments, it may be desirable to ensure that there is more coverage by the interstitial layer 110 of the first base material 100, than is necessary for coverage of the interstitial layer 110 by the second material layer 120, so as to reduce the risk of problems associated with unintentionally having some of the second material layer 120 deposited directly on to the first base material 100.

As referenced above, in the embodiments described above, the gate area 50 is formed in a gate insert 48, being an example of a gate formed in a mold insert in a mold stack. However mold gate structures may be formed in one or more other components of an injection molding machine such as in an area of an injection nozzle such as an inner surface area of a nozzle tip or in an area that extends between part of an injection nozzle and a mold insert.

Figure 9A:
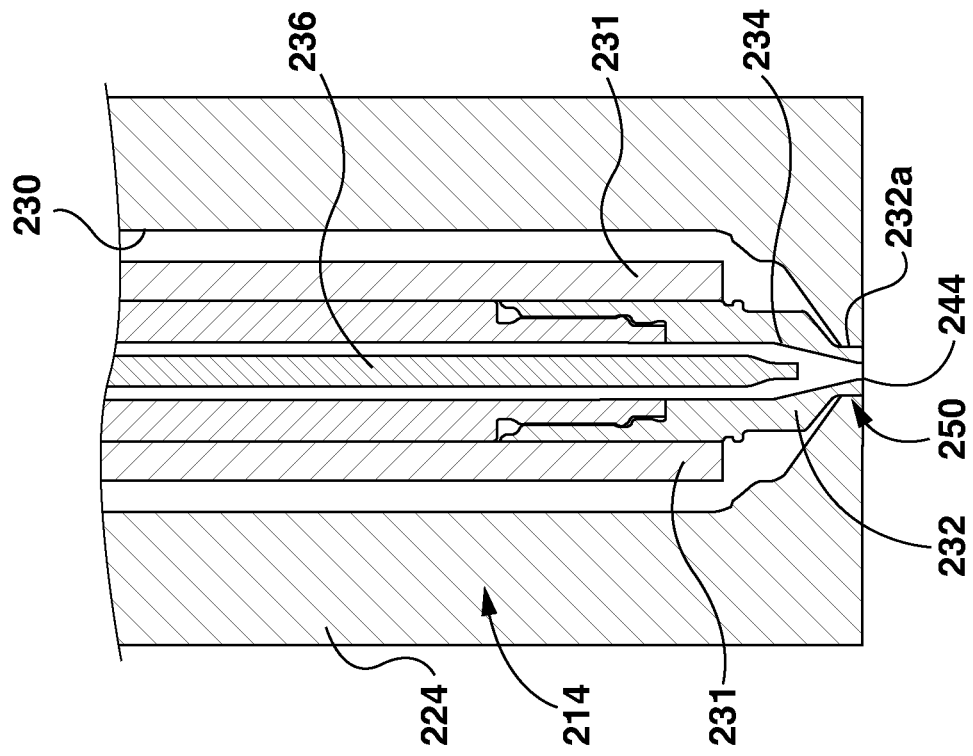
FIG. 9A is a vertical cross section view of a nozzle assembly of an alternate embodiment, with the mold gate shown in a closed operational configuration.
Figure 9B:
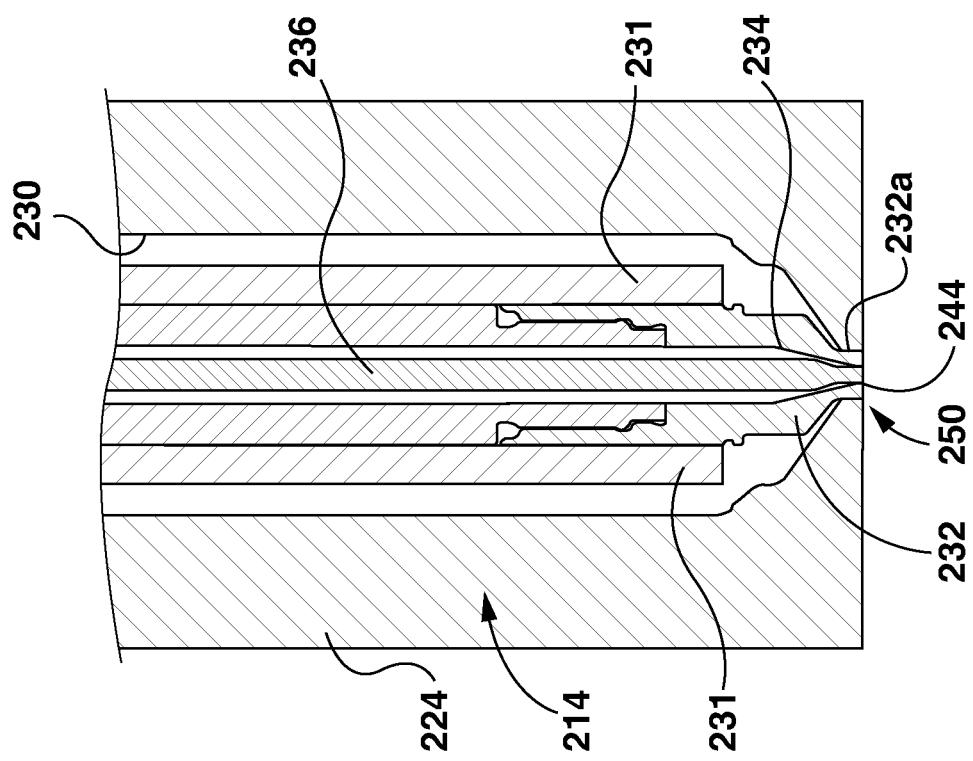
FIG. 9B is a vertical cross section view of the nozzle assembly of FIG. 9A, with the mold gate shown in an open operational configuration.

By way of example only, with reference to FIGS. 9A and 9B, a nozzle assembly 214 may be part of an injection molding machine similar to the injection molding machine 10 as depicted in FIG. 1 Nozzle assembly 214 may include a nozzle housing 230 in which may be held a nozzle body 231 and a nozzle tip 232. Nozzle body 231 may be mounted in a manifold plate (not shown) and another component 224 which may be a cavity block or gate insert. Through nozzle tip 232 runs a nozzle channel 234 communicating with a manifold melt channel (not shown) to enable resin to be communicated to the nozzle tip. Resin then may then flow through the nozzle tip in to mold inserts on the cavity side of the mold to a mold cavity.

A valve stem 236 can be located within nozzle channel 234 and can be reciprocated by a piston (not shown) between an open position (FIG. 9B) and a closed position (FIG. 9A). In the open position, the resin may flow into a mold cavity that may formed by one or more cavity members associated with a cavity plate (not shown). In the closed position, as shown, the valve stem 236 may be forced against a gate 244 formed in the nozzle tip 232 to restrict the flow of resin from the nozzle tip 232 and prevent the flow of resin into the mold cavity.

Gate 244 may in some other non-limiting embodiments be a thermally controlled gate and in other non-limiting embodiments a mechanically controlled gate. Where it is desired to employ mechanical valve gating to control the flow of resin into the mold cavity, gate 244 may be formed in a gate area 250 of nozzle tip 232. Nozzle tip 232 may be releasably attachable to a nozzle body 231 such as by providing co-operating interfacing cylindrical threads on the inner surface of nozzle body 231 and on the outer surface of the nozzle tip. The interfacing threaded surfaces are capable of engaging with each other to releasably secure the nozzle tip 232 to the nozzle body 231. Similar to the FIG. 2 embodiment described above, wear of the gate area 250 can occur by repeated opening and closing of the gate 244. This wear may occur where the tip of valve stem 236 seats in the closed position in gate 244 (FIG. 9A). Gate area 250 may be a generally tapered section of gate 244 that is complementary to the tapered tip of the valve stem 236. In FIG. 9A, nozzle assembly 214 is shown in a closed position with valve stem 236 seated in gate 244, thereby sealing the gate 244 and preventing the flow of resin into the mold cavity (not shown).

The inner surfaces of gate insert 248, including the inner surfaces in gate area 250, which are in contact with the molten resin, can also be subject to the corrosive influences of certain molten resins. This corrosive impact can particularly occur in the region surrounding the nozzle tip 232, where molten resin collects during operation of injection molding machine. This corrosive impact can also occur in the gate area 250 that defines gate 244.

The construction of a mold gate structure in nozzle assembly 214 having a nozzle body 231 and a nozzle tip 232 may be substantially the same as the gate structure described above with reference to FIGS. 2, 2A and 2B(I). In this embodiment, the nozzle tip 232 may comprise base 49 formed of a first base material 100 (as above—see FIG. 2B(I)) that may be relatively hard and strong material but may also be highly thermally conductive and may also be particularly suitable for machining. With respect to nozzle assemblies, including a nozzle tip 232, examples of such base materials 100 again include suitable tool steels such H13 tool steel and 420 stainless steels. The first base material 100 for gate 244 of nozzle tip 232 may similarly also be chosen with qualities such as one or more of: (a) relatively low cost (relative to exotic wear resistant materials); (b) relatively high degree of manufacturability; (c) polishability (for a mold cavity surface if applicable); (d) thermal conductivity and (e) in some cases corrosion resistance. Appropriate base materials 100 are typically tool steels.

Base 49 can in this embodiment define part of the inner surface of the nozzle tip 232 that defines part of nozzle channel 234 in the vicinity of gate area 250 of gate 244. Also with reference to FIG. 2B (I), the inward facing surface 51 of base 49 in this embodiment in gate area 250 of gate 244 made of the first base material 100, may have a second material layer 120 applied above surface 51, and in this embodiment directly thereto, by an additive manufacturing process to form a metallurgical bond in the same manner as described above.

As described above, the second material layer 120 may be made from a second material having at least one characteristic that differentiates the second material from the first material. Such characteristics may include one or more of (a) improved wear resistance (i.e. resistance to loss of material/damage from a mechanical source such as for example from movement of the valve stem in the gate), (b) improved erosion resistance (resistance to loss of material arising from the flow of plastic (and its filler materials if applicable) though the gate), (c) improved corrosion resistance (resistance to loss of material/other damage due to chemical interactions occurring with the material in the vicinity of the gate; and (d) increased hardness.

The second material layer 120 may be harder and thus more wear resistant than the first material. Hardness may be measured by techniques known in the art, as referenced above. Suitable wear resistant second material layer 120 materials may be metals, diamond particles, carbide particles, ceramics and the like and any combination thereof. More specifically, suitable wear resistant materials may include, but is not limited to, diamond metal matrix composites, tungsten carbide, tungsten carbide cobalt, cobalt alloys, nickel based carbide alloys, nickel chrome molybdenum alloys.

To facilitate the metallurgical bonding of the second material layer 120 material to the first base material 100, the second material layer 120 does not necessarily have to have a lower melting temperature than the first base material 100. For example, the second material layer 120 material may be heated locally such as with a laser and then added to the first base material 100 without melting the first base material 100.

In a preferred non-limiting embodiment for a gate 244 in a nozzle tip 232, first base material 100 may be H13 tool steel, and second material layer 120 may be Tungsten Carbide, with second material layer 120 being in the range of 0.5 to 3 mm in depth.

By providing a second material layer 120 for the inward facing surface of nozzle tip 232 in the vicinity of gate area 250 and gate 244, the overall wear, erosion and/or corrosion resistance of the gate area 250 defining the gate 244 can be improved and the life span of nozzle tip 232 may be extended. By providing a nozzle tip 232 that the can be releasably engaged with the nozzle body 231 (such as with interfacing threaded surfaces), if the gate 244 formed in nozzle tip 232 does start to encounter excessive wear, the nozzle tip 232 can be easily removed and replaced or possibly repaired such by applying a new second material layer 120 to base 100 may be carried out again to refurbish nozzle tip 232.

It should be noted that the repair of a gate area by applying a new second material layer 120 to a base 100 of a gate structure may be particularly useful when repairing a gate structure in a component such as a gate structure in a cavity block Thus, gate 244 may be provided that includes: (a) base 49 made from a first base material 100, with the base 49 having a gate area 250, and (b) a second material layer 120 formed above and directly on the first base material 100 in gate area 250, the second material layer 120 being made of a material that has a characteristic that differentiates the second material layer 120 from the first base material 100. The second material layer 120 may be metallurgically bonded to the first base material 100 and may have an inner surface that defines the gate 244. The differentiating characteristic may be increased resistance to at least one of mechanical wear, erosion and corrosion.

Methods of manufacturing the gate 244 are provided which use an additive manufacturing process, in that the inner layer is metallurgically bonded to the base material. Such an additive manufacturing process may comprise melting the second wear/erosion/corrosion resistant material and then when and as it cools down, fusing the second material and the first material together at the interfacing surfaces, thereby forming a metallurgical bond between the two materials.

Also in a manner similar to that described above, an example of an additive manufacturing process that may be used to form a gate 244 is where the second wear resistant material in the form of a powder or a wire is deposited onto the first outer layer of material. This may be carried out using laser deposition processes. Examples of second wear resistant material that may be employed in gate 244 in a powdered form are wear resistant metals, ceramics or metal matrix composites. The powder or the wire forming the second material may be melted with a high powered heat source such as for example a laser or electron beam. The melted second material may then form close contact with the first material, then cool and fuse together with the surface of the first base material at the interface surfaces. The result is that the second material becomes metallurgically bonded to the first material layer.

The second material 120 may be added to the first based material 100 by other additive manufacturing process as described above such as 1. Additive process that use a high power energy source (laser, electron beam) to melt a layer of powder that has been deposited on a substrate; 2.

Additive process that use the kinetic energy of powder particles to plastically deform the powder on to the workpiece (cold spray).

Since the inner surface of the layer of second material will then cover the top surface of the base material, the second material will be the material that is in contact with, for example, a valve stem and/or the resin, and may be able to better resist erosion, corrosion or mechanical wear than the first material of base 49 in gate 244.

To form a suitable gate 244 in a nozzle tip 232, a suitable additive material in the form of a powder or wire may be deposited onto the inner surface 232a of a nozzle tip that may be formed in a conventional manner but provided with a cylindrical opening diameter that is larger than the desired final diameter of the gate opening. The additive material may be a material of second material layer 120 as described above. The additive material may then be melted using a high power/energy source. Once the additive material has been melted, and fills the gate area 250, it can cool and solidify against the base material, such as H13 tool steel, and a metallurgical bond is created between the base material and the additive material, such as is described above.

Thereafter, the specific final form of the inner surface of nozzle tip 232 can be formed by suitable apparatuses and methods such as by electro-discharge machining ("EDM") and may be polished by known apparatuses and methods to produce a suitable finish.

Gate 244 of nozzle tip 232 may in some embodiments (like gate 44 in gate insert 48) be comprised of a three material layer configuration and include an interstitial layer 110 may be provided as a buffer or transition layer between potential incompatibility between the first base material 100 and the second material layer 120, in the same manner as described above, again with reference to FIG. 2B(II). A third interstitial layer 110 (buffer) may be provided that may be a material that forms a separate intermediate layer between the first base material 100 and the second material layer 120. The interstitial layer 110 may be deposited over the first base material 100 with an additive manufacturing process as referenced above, forming a first metallurgical bond, and then the second material layer 120 (such as is referenced above) may be deposited over the interstitial material layer 110 also with an additive manufacturing process forming a second metallurgical bond, preferably just with the interstitial material layer 110 and not the first base material 100. Interstitial materials, when required, are selected based on the incompatibility of the base material and additively formed material.

In a preferred embodiment, first base material may be H13 tool steel, interstitial layer 110 may be Nickel Chromium metal matrix and the second material layer 120 may be Diamond powder. Interstitial layer 110 may in the range of 0.05 to 0.5 mm in depth and second material layer 120 may be in the range of 0.5 to 3 mm in depth.

Also as described above, the interstitial layer 110 may be applied in any additive manufacturing process including for example using laser deposition processes. The interstitial material 110 could be added in the same manner as the second material layer 120, such that for example, if the second material layer 120 was added via a powder stream with laser heating, then prior to building up the second material layer 120, the interstitial material could be first blown in via the powder stream and then melted locally to form a metallurgical bond with the first base material 100. After the interstitial material 110 had been deposited, the powder stream could then be switched to deposit the second material layer 120. This same process may be applied regardless of whether the material is added via powder stream or by feeding a wire or tape of material. The interstitial layer 110 may be deposited in the case that the second material layer 120 was not compatible (e.g. has a different CTE, or a tendency not to bond well) with the first base material 100.

As also described above, typically the interstitial layer 110 would be allowed to fully solidify on to the first base material 100 before the second material layer 120 is applied to the outer surface of the interstitial layer 110.

The interstitial layer 110 may cover the majority of the first base material 100 in the gate area 250 of nozzle tip 232 and typically may completely cover the base first base material 100 in the gate area 250. Similarly, the second material layer 120 may cover the majority of the interstitial layer 110 and typically may completely cover the interstitial layer 110. In some embodiments, it may be desirable to ensure that there is more coverage by the interstitial layer 110 of the first base material 100, than is necessary for coverage of the interstitial layer 110 by the second material layer 120, so as to reduce the risk of problems associated with unintentionally having some of the second material layer 120 deposited directly on to the first base material 100.

The above description of the embodiments provides examples of the present invention, and these examples do not limit the scope of the present invention. It is understood that the scope of the present invention only is limited by the claims. The inventive concepts described above may be adapted for specific conditions and/or functions, and may be further extended to a variety of other applications that are within the scope of the present invention.

By way of example only, while the foregoing embodiments have been described with particular reference to the molding of PET preforms, it will be apparent that the mold gate components of the present invention can be adapted for any injection molding machine requiring a mold gate. By way of further example, although the foregoing embodiments have been described with particular reference to mechanical type mold gates, the invention can also be employed in other types of mold gates including thermally controlled mold gates where changes in temperature at the gate control whether the mold material will pass through the gate or not.

Having thus described the embodiments, it will be apparent that modifications and enhancements are possible without departing from the concepts as described.

Therefore, what is to be protected is limited only by the scope of the following claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

What is claimed is:

1. A method of forming a gate, the method comprising:
    (a) providing a base of a first base material, said base having a gate area;
    (b) adding a layer of an interstitial material to said base in the gate area by an additive manufacturing process to form a metallurgical bond;
    (c) adding a layer of a second material to the interstitial material in the gate area by an additive manufacturing process to form a metallurgical bond, wherein the second material has a characteristic that differentiates the second material from the first base material;
    (d) modifying an inner surface in said gate area comprised of said second material to define the gate;
    wherein the interstitial material has a coefficient of thermal expansion between the coefficients of thermal expansion of the first base material and the second material.

2. A method as claimed in claim 1 wherein said characteristic is at least one of increased wear resistance, increased erosion resistance, and increased corrosion resistance.

3. A method as claimed in claim 1 wherein said characteristic is a higher hardness relative to the first base material.

4. A method as claimed in claim 1 wherein said layer of interstitial material is added directly to a surface of said base.

5. A method as claimed in claim 1 wherein said gate area is at least in part in a mold insert of a mold stack.

6. A method as claimed in claim 1 wherein said gate area is at least in part in an injection nozzle.

7. A method as claimed in claim 1 wherein said gate area is at least in part in an injection nozzle tip of an injection nozzle assembly.

8. A method as claimed in claim 1 wherein the first base material comprises H13 tool steel.

9. A method as claimed in claim 1 wherein the interstitial material comprises nickel chromium metal matrix.

10. A method as claimed in claim 1 wherein the second material comprises diamond powder.

11. A method as claimed in claim 1 wherein a depth of the interstitial material may be in a range of 0.05 mm to 0.5 mm.

12. A method as claimed in claim 1 wherein a depth of the second material may be in a range of 0.5 mm to 3 mm.

13. A method of forming a gate in a mold component, said method comprising:
    (a) providing a base made from a first material;
    (b) forming a gate area in said base;
    (c) providing a second material that has a characteristic that differentiates the second material from the first material;
    (d) providing an interstitial material;
    (e) adding a layer of the interstitial material to said base in the gate area by an additive manufacturing process to form a metallurgical bond with the first material;
    (f) adding a layer of the second material to the interstitial material in the gate area by an additive manufacturing process to form a metallurgical bond with the interstitial material;
    (g) forming said gate such that an inner surface of the second material defines the gate; wherein the interstitial material has a coefficient of thermal expansion that is between the coefficients of thermal expansion of the first material and the second material.

14. A method as claimed in claim 13 wherein said characteristic is at least one of increased wear resistance, increased erosion resistance, and increased corrosion resistance.

15. A method as claimed in claim 13 wherein said characteristic is a higher hardness.

16. A method as claimed in claim 13 further comprising prior to (b), (h) forming an outside profile of the mold component in said base.

17. A method as claimed in claim 13 further comprising prior to (b), (i) forming a profile of an inner cavity of said mold component in said base.

18. A method as claimed in claim 17 further comprising after (i), wherein (b) comprises forming the gate area in said base from an inner cavity side of the mold component beneath said nozzle bore.

19. A method as claimed in claim 18 further comprising prior to (e) and after (b), (k) heat treating said base to harden said first material.

20. A method as claimed in claim 19, further comprising, after (f), (l) forming a specific form of the inner surface of a mold cavity in said base.

21. A method as claimed in claim 13 further comprising prior to (b), (j) forming a nozzle bore of said mold component in said base.

22. A method as claimed in claim 13 wherein said gate is formed in a mold insert of a mold stack.

23. A method as claimed in claim 13 wherein said gate is formed in an injection nozzle.

24. A method as claimed in claim 13 wherein said gate is formed in a nozzle tip of an injection nozzle.

25. A gate comprising:
    (i) a base made from a first material, said base having a gate area;
    (ii) an interstitial layer formed above said first material in said gate area, said interstitial layer being made of an interstitial material;

(iii) a third layer formed above the interstitial layer, said third layer being made of a second material that has a characteristic that differentiates the second material from the first material;

wherein the interstitial material has a coefficient of thermal expansion that is between the coefficients of thermal expansion of the first material and the second material; and wherein the second material is metallurgically bonded to the interstitial material and has an inner surface that defines the gate.

26. A gate as claimed in claim 25 wherein said characteristic is increased resistance to at least one of mechanical wear, erosion, and corrosion.

27. A gate as claimed in claim 25 wherein said interstitial material is bonded directly to said base.

28. A gate as claimed in claim 25 wherein said gate is at least in part in a mold insert of a mold stack.

29. A gate as claimed in claim 25 wherein said gate is at least in part in an injection nozzle assembly.

30. A gate as claimed in claim 25 wherein said gate is in a nozzle tip of an injection nozzle.

31. A gate as claimed in claim 25 wherein the first material comprises H13 tool steel.

32. A gate as claimed in claim 25 wherein the interstitial material comprises nickel chromium metal matrix.

33. A gate as claimed in claim 25 wherein the second material comprises diamond powder.

34. A gate as claimed in claim 25 wherein a depth of the interstitial material may be in a range of 0.05 mm to 0.5 mm.

35. A gate as claimed in claim 25 wherein a depth of the second material may be in a range of 0.5 mm to 3 mm.

36. A gate comprising:
(i) a base formed of a first material having a first hardness, said base having a gate area;
(ii) an interstitial layer formed of an interstitial material; and
(iii) an inner layer formed on said interstitial layer in the gate area, said inner layer made of a second material having a second hardness that is greater than the hardness of the first material;

wherein the second material is metallurgically bonded to the interstitial material and an inner surface of said inner layer defines the gate;

wherein the interstitial material has a coefficient of thermal expansion that is between the coefficients of thermal expansion of the first material and the second material; and wherein said gate is in a nozzle tip of an injection nozzle.

37. A gate as claimed in claim 36 wherein said gate is in a mold insert of a mold stack.

38. A gate as claimed in claim 36 wherein said gate is in an injection nozzle assembly.

39. A gate as claimed in claim 36 wherein said gate is in a nozzle tip of an injection nozzle.

* * * * *